United States Patent [19]

Fattinger et al.

[11] Patent Number: 5,456,891
[45] Date of Patent: Oct. 10, 1995

[54] PROCESS FOR THE PURIFICATION OF CONTAMINATED EXHAUST GASES FROM INCINERATION PLANTS

[75] Inventors: Volker Fattinger, Arlesheim, Switzerland; Juergen Ritter, Stuttgart, Germany

[73] Assignee: Nymic Anstalt, Schaan, Liechtenstein

[21] Appl. No.: 39,177

[22] PCT Filed: Aug. 10, 1992

[86] PCT No.: PCT/DE92/00669

§ 371 Date: May 26, 1993

§ 102(e) Date: May 26, 1993

[87] PCT Pub. No.: WO93/03823

PCT Pub. Date: Mar. 4, 1993

[30] Foreign Application Priority Data

Aug. 16, 1991 [DE] Germany .......................... 41 27 075.4

[51] Int. Cl.[6] .......................... C01B 17/74; B01D 53/14
[52] U.S. Cl. .................. 423/210; 423/239.1; 423/240 S; 423/244.01; 423/244.03; 423/245.3; 423/522; 423/523; 423/525; 423/531; 588/206
[58] Field of Search .................... 423/522, 523, 423/524, 525, 210, 240 S, 244.01, 245.3, 239.1, 539, 531; 588/206

[56] References Cited

U.S. PATENT DOCUMENTS

| | | | |
|---|---|---|---|
| 4,889,698 | 12/1989 | Moller | 423/210 |
| 5,173,286 | 12/1992 | Audeh | 423/566.1 |
| 5,294,409 | 3/1994 | Cohen et al. | 422/169 |

FOREIGN PATENT DOCUMENTS

| | | | |
|---|---|---|---|
| 0000515 | 2/1979 | European Pat. Off. | 423/523 |
| 0191725 | 8/1986 | European Pat. Off. . | |
| 0276883 | 8/1988 | European Pat. Off. | 423/239.1 |
| 0376356 | 7/1990 | European Pat. Off. . | |
| 0490202 | 6/1992 | European Pat. Off. | 423/240 S |
| 2609505 | 9/1976 | Germany . | |
| 2830215 | 2/1979 | Germany . | |
| 3313522 | 10/1984 | Germany | 423/240 S |
| 3426059 | 10/1987 | Germany . | |
| 3616501 | 11/1987 | Germany | 423/239.1 |
| 3706131 | 9/1988 | Germany . | |
| 3800881 | 7/1989 | Germany . | |
| 3935904 | 5/1990 | Germany . | |
| 3922921 | 1/1991 | Germany | 423/240 S |
| 4012887 | 10/1991 | Germany . | |
| 8911329 | 11/1989 | WIPO | 423/239.1 |

OTHER PUBLICATIONS

"Production of Sulfuric (and Nitric) Acid with a Modified Nitrogen–Oxide Sulphuric Acid Process" by V. Fattinger Proc. Brit. Sulphur Corp.; 3rd Int. Conf. London; Nov. 79 p. XXVI–9.

"Energie Spektrum", Jul. 1989, pp. 13–16.

"Von der Schadstoffquelle zur Schadstoffsenke—neue Konzepte der Müllverbrennung", Chem.-Ing. Tech., 60, (1988) Nr. 4, S., pp. 247–255. Apr. 1988.

"Sulphuric acid", Neue Zürcher Zeitung, Nr. 141, Jun. 21, 1989, p. 65.

Primary Examiner—Wayne Langel
Assistant Examiner—Timothy C. Vanoy
Attorney, Agent, or Firm—Foley & Lardner

[57] ABSTRACT

A process, using regenerable adsorption materials, for purifying exhaust gases that have been contaminated with at least $SO_2$, a heavy metal such as mercury and additional toxic gases such as dioxins and furans is disclosed. The process includes adsorbing the exhaust gases where the gas if freed of $SO_2$, heavy metal and additional toxic gases, and optionally subjecting the gas from the adsorber to further treatment. The contaminated adsorber material is subjected to an oxygen-free regeneration process and the gas from the regeneration process is scrubbed and subsequently processed into pure sulfuric acid in a nitric oxide-sulphuric acid plant.

9 Claims, 3 Drawing Sheets

PROCESS FOR THE PURIFICATION OF CONTAMINATED EXHAUST GASES FROM INCINERATION PLANTS

BACKGROUND OF THE INVENTION

1. Field of the Invention

The invention relates to a process, using regenerable adsorption materials, for purifying exhaust gases that have been contaminated with at least $SO_2$, a heavy metal, in particular mercury, and other toxic gases, in particular dioxins and furans, and that originate from incineration plants, in particular waste-incineration plants.

2. Description of Related Art

Exhaust gases from waste incineration plants contain HCl, HF, $SO_x$, Hg and $NO_x$, as well as highly toxic organic PCDD/PDCF compounds, known as dioxins and furans. In order to maintain clean air quality, the contaminants from the exhaust gases need to be eliminated and as far as possible reclaimed as re-usable materials.

Double or multi-stage lime-based wet-processes are known for the separation of HCl, HF and $SO_2$, which produce mainly $CaCl_2$ and $CaSO_4$ as reaction products. These reaction products must be taken and stored in waste disposal sites. A further disadvantage of these processes is that they produce contaminated waste waters that must be either subjected to purification or thermally disposed of. Only after such waste waters have been purified can they be conducted into a receiving canal or into the sewage system. This whole process is expensive, and damaging to the environment, because of the storage of the reaction products in waste disposal sites. There are known designs (cf. Chem.-Ing. Tech. 60, 1988, Pages 247–255) by which the heavy metals extracted during the purification in the wet-cleaning process can in principal be reprocessed and recovered. Since these processes are very expensive, with an unfavorable cost-benefit ratio, underground disposal is regarded as economically sensible and ecologically permissible. In the recovery of heavy metals in a large power plant, 2000 tons of salts per year are produced, which must then be subjected to controlled release into the sea. As for furans and dioxins, these can be easily destroyed at moderate temperatures by recycling the gases contaminated with them back through the incinerator.

There are proposals known for using a caustic soda solution as a neutralization medium to recover NaCl as an industrially marketable product, and thus reduce the amount of disposable waste material. This procedure is expensive and would only be feasible, given the high purity requirements for NaCl used in chlorine-alkali-electrolysis, if the HCl contained in the exhaust gas had previously been thoroughly separated from all remaining contaminants, something which is not possible using the known processes for producing NaCl.

There are also dry sorption processes known, that operate dry or almost dry and are also lime-based. The resulting reaction products are disposed of, along with the flue-dust from the incineration, as waste. In this process a further problem arises, since the dioxins and furans contained in the exhaust gas are not eliminated.

In both the dry and wet processes there is the problem of separating the mercury, present in gaseous form, from the exhaust gas. In the dry sorption process this separation is impossible, and in the wet-wash process it is at best unreliable.

In DE 37 06 131 A1 a process is known for removing contaminants from the flue gas, according to which the gas is previously treated in a wet scrubber and passed through a series of adsorbent beds. This process takes advantage of the fact that contaminants accumulate in the adsorber with a specific selectivity, so that smaller molecules are expelled from the adsorbent when it reaches saturation. The gas treatment provides for the removal of such components from the exhaust gas, since otherwise they could impede a subsequent catalytic denitration. In a first adsorber layer heavy metals, in particular mercury, are adsorbed. In one or two further layers $SO_2$ and HCl are adsorbed. Later, the contaminated adsorption material is passed through a further adsorption stage, in which excess ammonia from the denitration stage, contained in the gas, is adsorbed. The adsorption material, contaminated with ammonia, $SO_2$ and HCl, is subsequently burned in the incinerator. The coke, contaminated with heavy metal from the first adsorption stage, is removed and disposed of. The most common adsorption material used is (nonregenerable) smelting coke. This process can only be used subsequent to a prepurification of the flue gas, since otherwise all the adsorbed contaminants would be introduced back into the flue gas by the burning of the adsorbent. It has also been suggested that expensive varieties of activated coke could be used in the adsorption stages for the gaseous wastes and then regenerated. Nothing is said about what would happen to the contaminants that would be released during regeneration.

For the reasons cited, the known process is only usable for the final purification of previously purified flue gas.

Incinerating the waste-contaminated smelting coke carries with it the risk that dioxins and furans will not remain in the incinerator long enough to be destroyed, or that PCDD/PCDF recombinations may form because of the presence of $O_2$ and $Cl_2$ in the incinerator area, which may even be promoted by the catalytic effects of copper particles in the waste or in the flue-dust, and that these may result, together with the undestroyed dioxins and furans, in a gradual build-up of these highly toxic contaminants in the exhaust gas. The only way to exclude the dioxins and furans from the exhaust gas purification system, would be to dispose of the poison-contaminated smelting coke, which would increase yet further the amount of waste products to be disposed of.

"Energie Spectrum" of July 1989, (pages 13–16) published an overview of features of conventional processes from various suppliers. From this it is clearly the case with all adsorption processes, either that they result in waste products that must be disposed of, or that the contaminated adsorption coke and coal is incinerated, which for the reasons mentioned earlier is only advisable if the adsorption is used solely for the final purification of flue gases.

With the known dry sorption processes, alkaline additives are introduced to the burning material, in order to reduce the discharge of acidic gases from the waste products. The treatment of these contaminant-reduced flue gases with adsorbers also leads to considerable problems. For example, mercury cannot be separated from the lime products used in the dry sorption process. Incinerating the contaminated smelting coke in the burner would lead to a gradual build-up of mercury in the exhaust gas. This has led to the idea of processing the smelting coke so that the residual $SO_2$, HCl and HF adsorbed by the coke, as well as the mercury from the coke, is thermally desorbed; the mercury is then readsorbed onto sulphur-treated coke, and the remaining wastes together with the decontaminated coke are returned to the burner. The sulphur-treated and mercury-contaminated coke has to be disposed of in special storage.

Meanwhile, dry sorption has led in yet another direction, in order to isolate the dioxins and furans and the mercury. A small amount of smelting coke is added to the lime that is used in the dry adsorption to help separate out the $SO_2$, HCl and HF, and this coke adsorbs the dioxins and furans as well as the mercury. In addition the smelting coke adsorbs certain further amounts of $SO_2$, HCl and HF.

This process however only leads to an increase in waste products, since the contaminated coke, along with the products of the lime reaction, most often still mingled with flue dust, must be transported to disposal sites and stored there.

There is still no long-term experience with the storage of smelting coke that has been contaminated with dioxins and furans, mercury, $SO_2$, HCl and HF. Even storage in special disposal sites seems questionable, in light of the dioxins and furans and mercury present. Using this process for purifying the exhaust gases from waste incineration plants would, besides, increase disposal costs considerably, because of the need for special storage facilities for reaction products that hitherto could be more cheaply stored in single-purpose disposal sites.

Furthermore, the application of this process makes it essential to use in addition an activated charcoal filter after the dry sorption for the separation of residual $SO_2$, HCl and HF, since with dry sorption it is difficult to achieve the required low concentrations of contaminating residue in the purified gas. Incineration of the contaminated coke in the burner is acceptable in this case, however, since only $SO_2$, HCl and HF are released, and the dry sorption serves as a sink for them. The activated charcoal filter serves here exclusively for the final purification of the exhaust gases, but not however for the separation of dioxins, furans and Hg.

All known flue-gas treatment processes give rise to waste products that must be disposed of, if the build-up of toxic substances in the exhaust gas is to be avoided.

A process is known, from DE 34 26 059 A1, specifically for removing organic contaminants, in particular dioxins and furans, from flue-gases through adsorption. This separation should at the same time make it possible to remove other contaminants like $SO_2$ and heavy metals. The activated charcoal or coke used for the adsorption is subjected to the conventional regeneration process with inert gases in the temperature range of about 350°–750° C. To split out the dioxins and furans, the contaminated desorption gas drawn from the regeneration process is heated to a temperature of over 1,000° C., up to about 1,400° C. In this way the decomposition or splitting temperature for dioxins and furans should be exceeded, thus ensuring that they are destroyed. The required duration of this splitting temperature is in the order of a few seconds, perhaps 5–10 seconds. In this way it should be possible to destroy dioxins and furans in the course of desorption in the regeneration stage. The publication presents no design for the further treatment of the remaining contaminants.

The problem addressed by this invention lies in the context of avoiding the production of wastes that must be disposed of, or exhaust gases that harm the environment, and involves the description of a process for purifying exhaust gases of their content of $SO_2$, and mercury and other toxic gases, in such a way as to allow the profitable recovery of materials.

SUMMARY OF THE INVENTION

The invention resolves the problem using a process of the kind described at the outset, involving the following process steps:

the exhaust gas is led through an adsorber whereby the $SO_2$, the heavy metal and other toxic gases are removed, as it leaves the adsorber the gas is subjected to further purification as necessary and finally released, the contaminated adsorption material in the adsorber is subjected to an oxygen-free regeneration, the rich gas resulting from the regeneration is passed through a gas scrubber and then processed in a nitric oxide-sulfuric acid plant into pure sulfuric acid.

DETAILED DESCRIPTION

Figure 1:
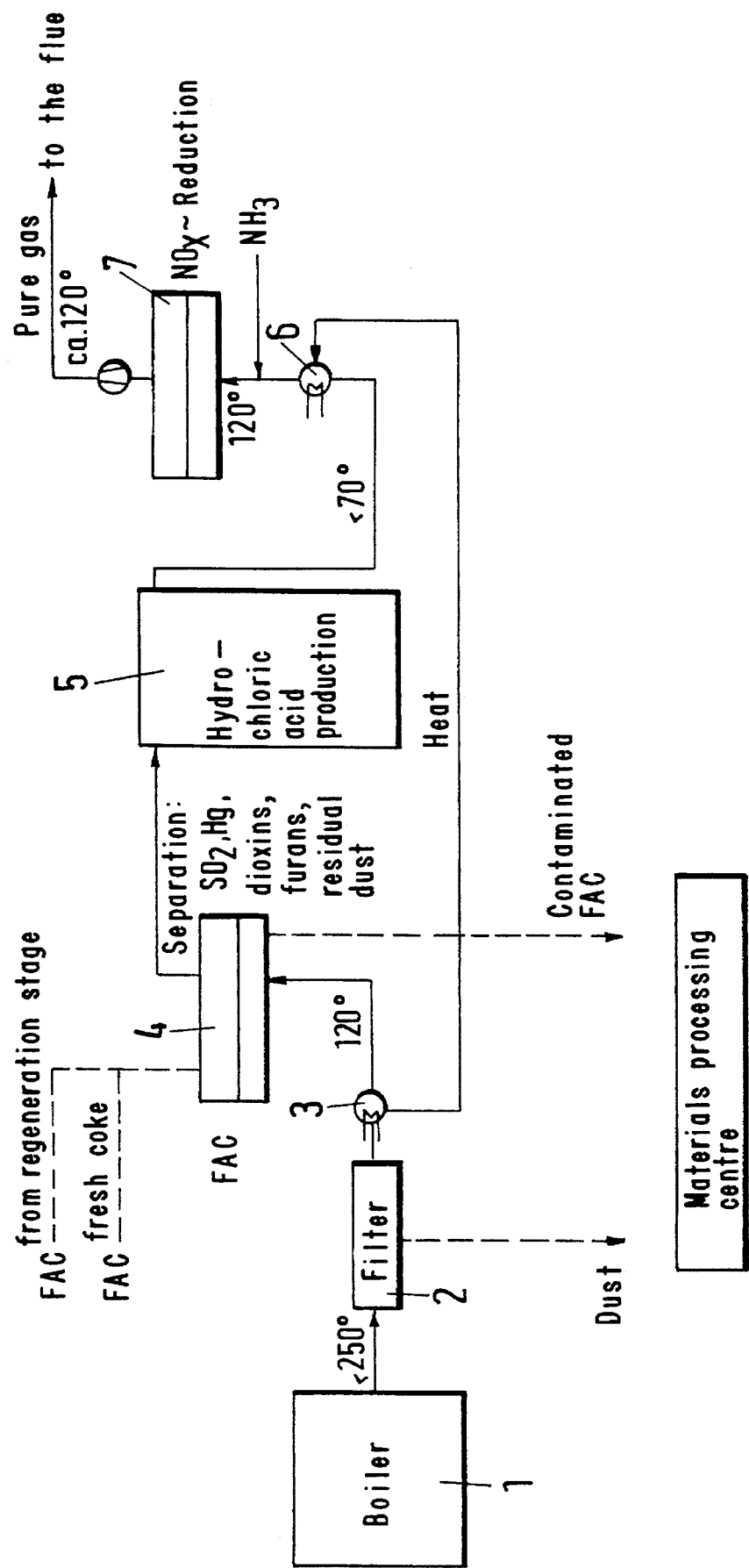
FIG. 1 illustrates a diagrammatic representation of purification stages for the exhaust gas from an incineration plant.

In the process according to the invention the exhaust gas with its stated components is conducted into the first adsorber, where the $SO_2$, the heavy metal, in particular mercury, and the toxic gases like dioxins and furans are adsorbed. The $SO_2$ is catalytically converted into $H_2SO_4$ in the porous texture of the adsorption material, which should preferably be activated coke (mineral charcoal). This adsorption is designed and regulated, as to the thickness of the adsorption bed (preferably a moving bed) and the treatment time of the gas in the adsorber, so that the stated contaminants are removed to the measurable limit. It is preferable to apply the countercurrent process, principally so as to achieve a separation of $SO_2$, on one hand, and on the other hand the HCl and any HF contained in the exhaust gas. This separation is possible because the HCl and any HF present, in contrast to the $SO_2$, is difficult for the adsorption material, e.g. activated coke, to remove. In particular, the adsorbed $SO_2$, because of its heavier molecular weight, displaces the small amounts of HCl and HF adsorbed by the adsorption material. In the countercurrent process HCl and HF are at first adsorbed in the upper layer of activated coke, since the exhaust gas, flowing through this layer before leaving the adsorber, contains no more $SO_2$, all of which has been earlier adsorbed in the lower layers. The use of a moving bed allows the upper layer of activated coke, contaminated with HCl and HF, to penetrate gradually into the lower layers, where it comes in contact with the $SO_2$ or $H_2SO_4$ of the exhaust gas. In this way the HCl and HF from the activated coke are desorbed again, and $SO_2$ is adsorbed in their place. Thus the result of this process is that HCl and HF only pass through the adsorber. After the adsorber the HCl can be used, after removal of any HF present, to produce market-quality hydrochloric acid and/or sodium chloride. Besides its main function, i.e. the removal of contaminants, the adsorber can also serve temporarily as a filter for removing dust from the exhaust gas. This can be especially important if the filter itself is out of service for a short time. In this way, by gauging pressure differences, small amounts of dust-contaminated activated coke, serving in this case as a filter medium, can be removed with help of a sensitively controllable removal system, without having to interrupt the flow of raw gas through the adsorber. In any case however, there will be further removal of dust from the exhaust gas by the activated coke bed in the adsorber.

There are known processes available for the removal of nitrogen compounds from the exhaust gases of waste incineration plants. They work by applying SCR catalyzers or specially activated coke to $NO_x$, reduction using $NH_3$. For denitrating gases from which all other contaminants have already been removed, preferably after HCl recovery, the gas is fed into a denitration reactor, where $NH_3$ is mixed with the exhaust gas, before and/or during the denitration. The denitration is achieved by use of specially activated coke. The $NO_x$ is reduced catalytically under the effect of $NH_3$, so that the gas released into the atmosphere is largely free of contaminants.

For the desorption of contaminants, $SO_2$ and heavy metal, in particular mercury, that were separated from the exhaust-gas and built up in the adsorbent during the adsorption, the contaminated adsorbent is subjected to a thermal regeneration, after dust and small particles have been removed from it through sieves and screens and returned to the incinerator. During the regeneration process, the $H_2SO_4$ present in the porous structure of the adsorption material, in particular activated coke, is again converted to $SO_2$ and carried away in the rich gas. This rich gas represents a mixture of inert fuel-gas and the re-gasified contaminants, provided that, using the preferred method, the heating of the contaminated adsorption material is effected using a hot inert gas. The desorbed mercury is also contained in gaseous form in the rich gas.

The inert fuel-gas is passed through the contaminated adsorption material, in a countercurrent, and preferably at an initial temperature of over 550° C., in particular at 650° C. To hold the fuel-gas at the desired temperature, it can be mixed with the rich gas coming from the regeneration process at about 325° C. In addition, by varying the volume of the rich gas that is returned and mixed with the inert gas, the concentration of $SO_2$ in the rich gas can be held at the level best suited to making the commercial product. With the fuel-gas, a convective heating of the contaminated adsorption material occurs, and thanks to the good heat-conducting properties, in particular of activated coke, during the counter-flow of the fuel-gas, this produces a relatively short desorption time and economizes on energy use.

By means of this heating of the contaminated adsorbent, with the fuel-gas at about 650° C. and with the adsorbent remaining in the first regeneration stage for more than half an hour, or preferably more than one hour, the dioxins and furans adhering to the adsorbent material are completely destroyed. The fact that the regeneration process occurs without oxygen means that there can be no recombination of PCDD/PCDFs.

The regenerated adsorbent can be recycled for further use in the adsorber. The small amounts of adsorbent that are consumed are supplemented by the addition of corresponding fresh adsorbent.

The rich gas drawn off from the regeneration process contains desorbed $SO_2$ and the heavy metal. In accordance with the invention, pure sulfuric acid is recovered from the rich gas, with the help of the known nitric oxide-sulfuric acid process. Since according to the invention the sulfuric acid is recovered from the exhaust-gas in conjunction with the regeneration process, i.e. along with the rich gas, the concentration of $SO_2$ is ideal for the nitric oxide-sulfuric acid process, as is the composition of the $SO_2$-bearing gas, since this for example will have at worst only insignificant traces of other acids, like HCl, HF etc.

The nitric oxide-sulfuric acid process has long been known, as the so-called "lead-chamber process", for producing sulfuric acid. Over the past decades it has been further developed, and can now be carried out using small-scale equipment (cf. V. Fattinger, "Schwefelsäure, das Schlüsselerzeugnis der chemischen Industrie" ["Sulfuric acid, the key product of the chemical industry"] in the Neue Zürcher Zeitung of Jun. 21, 1989, page 65).

Use of the nitric oxide-sulfuric acid process permits the recovery of very pure, market-quality sulfuric acid, without the necessity of absolute purification of the $SO_2$-rich gas to meet air quality standards. It is preferable to recycle the exhaust-gases arising from the nitric oxide-sulfuric acid plant back into the incineration plant. Gaseous or aerosol forms of impurities will then pose no problem. Catalytic contact plants, in which gas containing $SO_2$ might also be processed into sulfuric acid, will not tolerate any contaminated residues, since the catalyzer would be poisoned by gaseous and aerosol impurities.

The process according to the invention permits the production of a sulfuric acid of high purity, even if the $SO_2$-rich gas contains organic impurities that have not been completely removed during the prior gas scrubbing. Sulfuric acid produced in a contact plant under such circumstances, where the organic material is only partly oxidized, would become turbid and would thus be of lesser value.

It is advantageous to keep the temperature of the gas that is fed into the nitric oxide-sulfuric acid plant at more than 60° C. In this case, complete oxidation of the organic substances is achieved, in particular of toxic dioxins and furans, since the denitrating tower (Glover) of the nitric oxide-sulfuric acid plant can be operated at a sufficiently high temperature. This effect is enhanced if a scrubbing spray is applied consisting essentially of nitrosylsulfuric acid heated to a temperature of 90° C. or more, during the denitrating stage.

Applying the process according to the invention permits the separation of $SO_2$ and of any mercury still remaining in the scrubbed rich gas, because the nitrosylsulfuric acid oxidizes mercury vapor and adsorbs it as mercury sulphate. The sulfuric acid thus produced, which can be 75 to 78%, can then be treated with $Na_2S_2O_3$, so that HgS precipitates and can be removed through filtration.

The invention is further explained below, with reference to the attached Figures.

FIG. 1 illustrates how exhaust gas coming from the boiler of an incineration plant 1, in particular a waste-incineration plant, is passed through a dust filter 2, whereby dust is filtered out of the exhaust gas. As it passes out of the filter 2, the exhaust gas enters a heat exchanger 3 and then, with a temperature of about 120° C., passes into an adsorber 4, equipped with a moving bed of activated filter coke, through which the gas is passed in a countercurrent. Such an adsorber 4 makes it possible to remove $SO_2$, heavy metal, in particular mercury, as well as dioxins and furans and residual dust. On the other hand, practically no gaseous HCl is adsorbed; this substance is precipitated as hydrochloric acid in the following stage 5, right after the adsorber 4, for example by means of scrubbing. The gas leaves this stage 5 with a temperature of under 70° C. and is reheated to 120° C. in a heat exchanger 6, that is connected for this purpose to the heat exchanger 3. With the addition of $NH_3$, a reduction of nitric oxide to elementary nitrogen occurs in a denitration stage 7. As it leaves the denitration stage 7 the gas exists in pure form, with a temperature of about 120° C., and can be blown off through a flue into the atmosphere.

Figure 2:
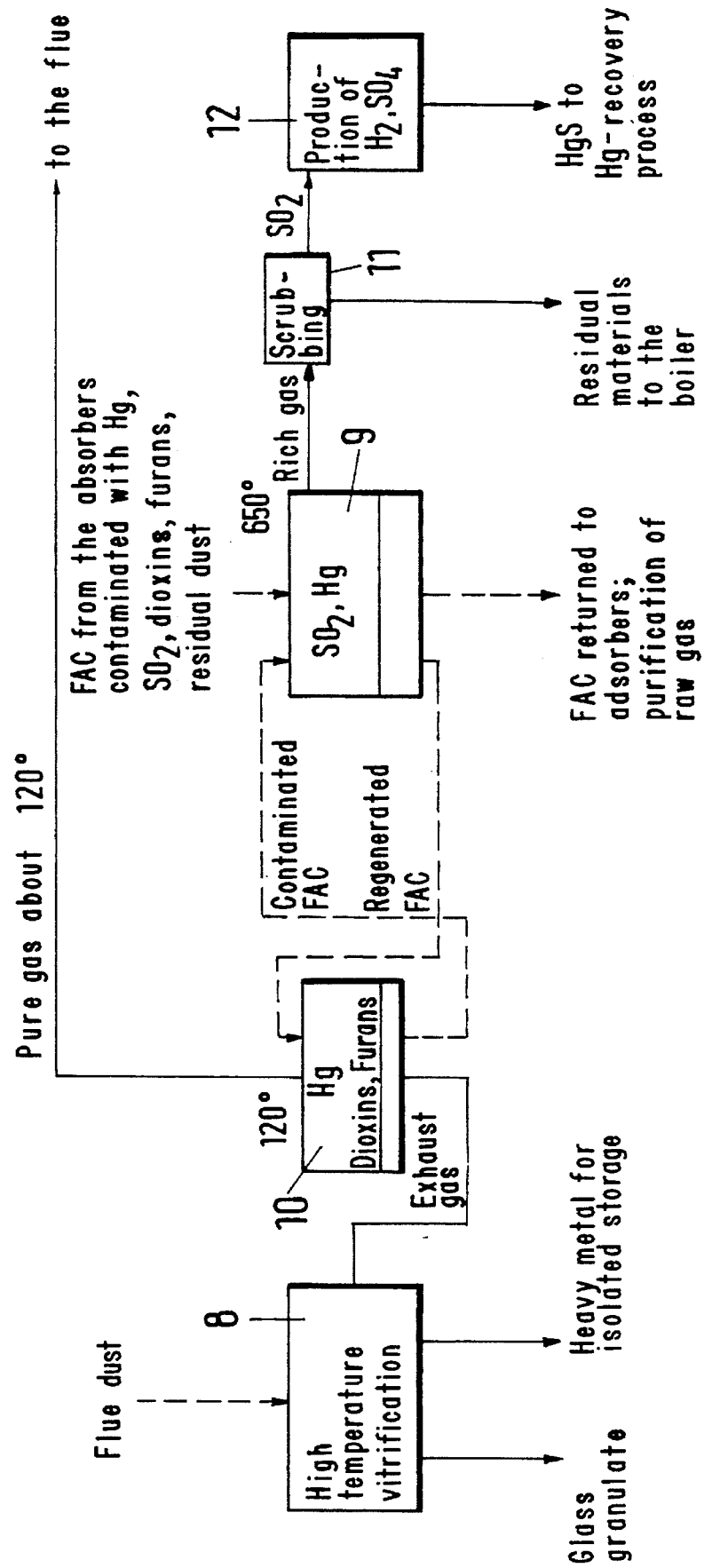
FIG. 2 illustrates a diagrammatic representation of recovery stages for the materials resulting from the purification process as shown in FIG. 1.

FIG. 1 shows how the dust removed by the filter 2, and the contaminated activated coke of the adsorber 4 are reprocessed in a central materials recovery operation, shown in FIG. 2.

The contaminated activated coke of the adsorber 4 enters a regeneration stage 9, in which the coke, according to a known method, is heated by inert gas at about 650° C. and is freed of the adsorbed amounts of $H_2SO_4$ and heavy metal (in particular Hg). The dioxins and furans that have also been adsorbed on the activated coke are thermally destroyed in the regeneration process. This result is achieved in particular because the regeneration process 9 operates free of oxygen.

In the regeneration stage 9 there is also introduced activated coke, contaminated with mercury, dioxins and furans, from a small second adsorber, which is treated in the same way as the contaminated coke from the first adsorber 4. The small adsorber 10 is installed behind a thermal flue-dust treatment plant 8, in which the heavy metals contained in the flue-dust are recovered as smeltable metallic salts, and the flue-dust is vitrified into an inert material. The illustrated process assures that the highly toxic materials contained in the exhaust gas from the thermal flue-dust treatment plant 8 are safely impounded and treated in the same way as the materials contained in the raw gas.

The pure gas leaving the adsorber 10 is likewise released through a flue into the atmosphere, at a temperature of about 120° C.

The activated coke treated in the regeneration process 9 is returned for re-use in the two adsorbers 4 and 10. The minimal amounts of activated coke lost during the recycling between adsorption and regeneration are replaced with corresponding amounts of fresh coke.

Figure 3:
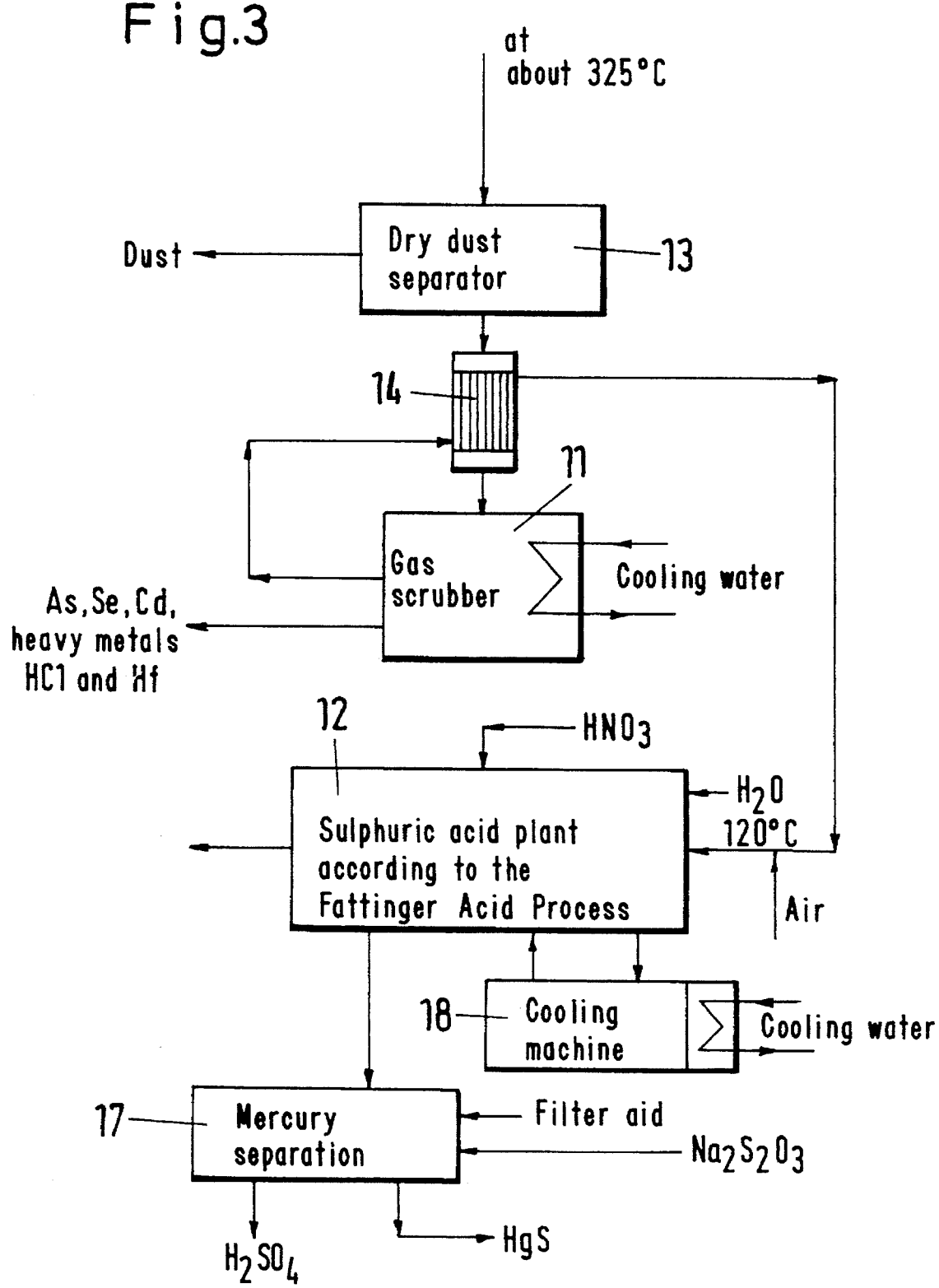
FIG. 3 illustrates a diagrammatic representation of the treatment of rich gas arising from a desorption.

The rich gas leaving the regeneration process 9 enters a gas scrubber 11, in which heavy metals, like arsenic, selenium, cadmium and possibly acid particles (HCl and HF) are washed out with a small amount of water at a rate of about 25 liters per hour. This small amount of water, together with the scant residual materials is recycled into the boiler of the incineration plant 1. The gas leaving the scrubber stage 11 enters a nitric oxide-sulfuric acid plant 12, in which high purity (75 to 78%) sulfuric acid is produced, and mercury in the form of mercury sulphide precipitates and is filtered out. From the resulting filter cake of HgS, mercury in metallic form can be recovered. FIG. 3 shows in detail the treatment of the desorption gas as it leaves the regeneration stage 9. It passes first into a dry dust remover, through which any coal dust resulting from the regeneration 9 is removed. The dust so removed is conducted to the boiler of the incineration plant 1. The rich gas, now free of dust, then enters a heat exchanger 14 in a scrubbing and cooling stage 15, in which traces of heavy metal like arsenic, selenium, cadmium and possible amounts of gaseous HCl and HF are removed. The purified gas goes next to a nitric oxide-sulfuric acid plant 16, in which $HNO_3$ and $H_2O$, and air if necessary, are added to the $SO_2$ in the rich gas to produce sulfuric acid, by the known Fattinger Acid Process. In order to oxidize organic substances completely, in particular the toxic dioxins and furans, it is necessary to operate the denitrating tower (Glover) of the sulfuric acid 16 plant at a sufficiently high temperature. For this purpose, the purified $SO_2$-rich gas is heated in the heat exchanger 14 to a temperature above 60° C., for example to 120° C.

The sulfuric acid in the packed towers of the sulfuric acid plant, containing nitrosylsulfuric acid, oxidizes metallic mercury vapors that may be contained in the scrubbed $SO_2$-rich gas, and adsorbs them as mercury sulphate.

In the sulfuric acid plant, sulfuric acid of 75 to 78% is produced and treated with $Na_2S_2O_3$, which causes the mercury sulphate to precipitate as mercury sulphide (HgS). The precipitated HgS is filtered out in the mercury removal stage 17, so that at the end of the mercury removal stage high-purity sulfuric acid and pure HgS are obtained. The 75-to-78% sulfuric acid so obtained is immediately marketable, and can be used as battery acid. Mercury in metallic for can be recovered from the HgS so produced.

The sulfuric acid plant 16 contains nitric oxide adsorption towers (Gay-Lussac towers) that must be kept at low temperatures to minimize the loss of nitric oxide. A cooling machine is therefore connected to the sulfuric acid plant 16, which permits the adsorption temperature to be kept at under 10° C.

The loss of nitric oxide inherent in the process can be compensated with NO present in the rich gas, or by adding $HNO_3$ in the denitrating tower. At temperatures of under 10° C. in the nitric oxide adsorption, a content of 1 g NO per 1,000 g $SO_2$ in the $SO_2$-rich gas is sufficient to operate the system without use of $HNO_3$. In the case of a NO-free rich gas, the amount of $HNO_3$ required is less than 1 kg per 1,000 kg of sulfuric acid produced (expressed as 100% $H_2SO_4$).

The nitric oxide-sulfuric acid plant 16 contains a special tower, in the known manner, to which the acid produced is conduced and there completely freed of nitric oxide. The denitrating tower (Glover) is separate, with respect to the gases, from the production denitrating tower, and can be operated even under conditions of extreme oxidation, since a small concentration of nitrosylsulfuric acid in the outflow is acceptable. In the upper portion of the denitrating tower (Glover) the scrubbing acid contains nitrosylsulfuric acid and small amounts of nitric acid. It is a known process to heat the denitrating tower and produce the exothermic reaction by preheating the scrubbing acid to temperatures above 90° C. This known operating method for nitric oxide-sulfuric acid plants 16 is used according to the invention for the oxidation of organic compounds (such as dioxin and furans) to $CO_2$ and $H_2O$.

The sulfuric acid plant 16 contains consequently an additional safety step, where dioxins and furans are destroyed, so that these substances cannot build up in the cycle, when the exhaust gases from the sulfuric acid plant 16 are returned, according to the invention, to the incinerator plant boiler 1.

The sulfuric acid produced in the sulfuric acid plant 16 is substantially purer than the usually traded sulfuric acid from contact plants. The acid produced here can be diluted as needed with distilled water and used directly as the electrolyte for lead batteries. The plant can be designed so that the scrubbed $SO_2$-rich gas comes in contact only with apparatus made of glass or of acid-resistant plastic. The process according to the invention can therefore be conducted and handled without difficulty.

We claim:

1. A process for the purification of exhaust gases from an incineration plant (1) contaminated with $SO_2$, at least one heavy metal selected from the group consisting of cadmium and mercury, dioxins, furans, arsenic, selenium, HCl and HF by using regenerable adsorption materials, said process comprising the steps of:

(a) passing said exhaust gas through an activated coke adsorber (4) to free said gas of $SO_2$, heavy metal and additional toxic gases to produce contaminated adsorption material and a gas free of $SO_2$, heavy metal and additional toxic gases;

(b) subjecting said contaminated adsorption material from step (a) to an oxygen-free regeneration process (9) to produce a gas containing $SO_2$ and heavy metal;

(c) scrubbing said gas from step (b) in a gas scrubber (11) to remove arsenic, selenium, at least one heavy metal selected from the group consisting of cadmium and mercury, HCL and HF and to produce a scrubbed gas; and (d) processing said scrubbed gas in a nitric oxide-sulphuric acid plant (12) to produce sulphuric acid having a concentration of 75–78 %.

2. Process according to claim 1, wherein the temperature of the gas conducted to the nitric oxide-sulphuric acid plant (12) is held at greater than 60° C.

3. Process according to claim 1, wherein in the nitric oxide-sulphuric acid plant (12) a denitration stage is provided for removing nitric oxide from the sulphuric acid produced, in which stage a scrubbing agent consisting essentially of nitrosylsulphuric acid is used, at a temperature of 90° C. or higher.

4. Process according to claim 1, wherein mercury present in the sulphuric acid is reacted with $Na_2S_2O_3$ added to said sulphuric acid to form mercury sulphide which precipitates and is subsequently filtered out of said acid.

5. Process according to claim 1, wherein the exhaust gas emanating from the nitric oxide-sulphuric acid process is recycled to the incineration plant (1).

6. A process for the purification of exhaust gases from an incineration plant (1) contaminated with $SO_2$, at least one heavy metal selected from the group consisting of cadmium and mercury, dioxins, furans, arsenic, selenium, HCl and HF by using regenerable adsorption materials, said process comprising the steps of:

(a) passing said exhaust gas through an activated coke adsorber (4) to free said gas of $SO_2$, heavy metal and additional toxic gases to produce contaminated adsorption material and a gas free of $SO_2$, heavy metal and additional toxic gases;

(b) subjecting said contaminated adsorption material from step (a) to an oxygen-free regeneration process (9) to produce a gas containing $SO_2$ and heavy metal;

(c) scrubbing said gas from step (b) in a gas scrubber (11) to remove arsenic, selenium, at least one heavy metal selected from the group consisting of cadmium and mercury, HCL and HF and to produce a scrubbed gas; and (d) processing said scrubbed gas in a nitric oxide-sulphuric acid plant (12) to produce sulphuric acid having a concentration of 75–78 %, wherein a denitration stage is provided in said nitric oxide-sulphuric acid plant (12) for removing nitric oxide from the sulphuric acid produced, and wherein a scrubbing agent consisting essentially of nitrosylsulphuric acid is used at a temperature of at least 90° C. in said denitration stage.

7. A process according to claim 6, wherein the temperature of the gas conducted to the nitric oxide-sulphuric acid plant (12) is held at greater than 60° C.

8. A process according to claim 6, wherein mercury present in the sulphuric acid is reacted with $Na_2S_2O_3$ added to said sulphuric acid to form mercury sulphide which precipitates and is subsequently filtered out of said acid.

9. The process according to claim 6, wherein the exhaust gas emanating from the nitric oxide-sulphuric acid process is recycled to the incineration plant (1).

* * * * *